United States Patent [19]
Sugiyama

[11] Patent Number: 5,274,706
[45] Date of Patent: Dec. 28, 1993

[54] TUNING SYSTEM FOR TELEVISION SIGNAL

[75] Inventor: Osamu Sugiyama, Kanagawa, Japan

[73] Assignee: Sony Corporation, Tokyo, Japan

[21] Appl. No.: 922,268

[22] Filed: Jul. 30, 1992

[30] Foreign Application Priority Data

Aug. 9, 1991 [JP] Japan ................... 3-223736

[51] Int. Cl.[5] .................................. H04N 7/167
[52] U.S. Cl. ........................ 380/13; 380/10; 380/20; 380/15
[58] Field of Search ............ 380/13, 10, 20, 15

[56] References Cited

U.S. PATENT DOCUMENTS

| | | | |
|---|---|---|---|
| 4,771,456 | 9/1988 | Martin et al. | 380/13 |
| 4,908,860 | 3/1990 | Caprarese et al. | 380/13 |
| 4,910,771 | 3/1990 | Hosoya et al. | 380/13 |
| 5,056,139 | 10/1991 | Littlefield | 380/13 |

Primary Examiner—David C. Cain
Attorney, Agent, or Firm—Jerry A. Miller; Robert P. Biddle

[57] ABSTRACT

A tuning system for a television signal in which a TV receiver apparatus and a signal decipher apparatus are connected to each other to receive both of a scrambled TV signal and a non-scrambled signal. The system includes terminating the tuning operation when the signal decipher apparatus detects an identification signal representing the scrambled TV signal, and terminating the tuning operation when the identification signal is not detected by a synchronizing signal for the non-scrambled TV signal is detected.

2 Claims, 2 Drawing Sheets

TUNING SYSTEM FOR TELEVISION SIGNAL

BACKGROUND

1. Field of the Invention

The present invention relates to a tuning system for a television signal received from a cable line or other source. In particular, this invention relates to a tuning system suitable for a television receiver provided with a scramble system which can tune a scrambled television signal.

2. Background of the Invention

Cable television (CATV) systems are very popular for providing television programs on a plurality of channels through a cable line provided within a certain geographic area. Such a CATV system includes a wide-band transmission line which provides the television receiver at each home with several kinds of information and programs through a coaxial cable. Often such systems provide pay services such as databases and movies using a regular TV signal which undergoes a scrambling process. A specific signal descrambler (or decipher) is used to receive these pay services so that only subscribers who pay the cable companies and receive the descrambler can see the program.

In such a system, among the channels provided, a desired TV signal is selected by a tuning apparatus forming a part of the TV receiver. When the TV signal is scrambled, the above mentioned descrambler automatically converts the scrambled signal to a regular TV signal (video signal) to make it appear properly on the television screen.

A cable-ready TV receiver apparatus has been developed, which can be connected to the descrambler by an exclusive connecter (a so called multi-port connecter) so that cable pay programs can be obtained by merely purchasing the descrambler. Such a cable-ready TV receiver apparatus in general performs Automatic Frequency Tuning (AFT) operation when tuning. This keeps the receiver tuned to precisely receive the desired channel. A video signal demodulated in this condition is provided to the descrambler through the multi-port connecter. When the video signal is scrambled, a detectable information signal is inserted into the video signal to identify the scrambling process. The video signal, therefore, can be converted to regular (descrambled) video signal which is then sent back to the cable-ready TV receiver through the multi-port connecter. The proper image thus appears on the screen.

AFT has been widely adopted in cable-ready TV receivers for its tuning operation. As is well known, an AFT control signal can be obtained by detecting the Intermediate Frequency (IF) signal. This AFT signal is utilized as the variable voltage for a local oscillator circuit of the tuner to obtain precise tuning. The demodulated video signal is inspected to see if it contains a horizontal synchronizing signal or a vertical synchronizing signal. The presence of one of these signals confirms proper AFT operation.

To implement this confirmation, a counting operation is performed for either the horizontal synchronizing signal (hereafter H sync. signal) or vertical synchronizing signal (V sync. signal) over a certain time period. However, when a scrambled TV signal is received at a certain channel, H or V sync. signals are not present or corrupted by the scrambling process. The descrambling operation by the descrambler is therefore required for the above mentioned confirmation operation of the AFT. The time required for the descrambler to decipher the scrambling is generally 2-5 seconds depending on the scrambling method. As a result, when a scrambled program is selected at certain channel, it takes a relatively long time for the AFT operation to complete the tuning process. The user of the TV receiver apparatus is therefore inconvenienced.

SUMMARY OF THE INVENTION

It is, therefore, an object of the present invention to provide a tuning system for a television signal which addresses the above mentioned problems.

It is another object of the present invention to provide a tuning system for television signals, which can shorten the time required for the tuning operation.

It is also an object of the present invention to provide a tuning system for television signals, which is suitable for use with a cable converter for deciphering a scrambled TV signal.

In one aspect of the present invention, a tuning system for television signal includes a TV receiver apparatus and a signal decipher apparatus which are connected by a multi-port connector to receive both a scrambled TV signal and a regular non-scrambled TV signal. When the signal decipher apparatus detects an identification signal representing of the scrambled TV signal, the tuning operation of the system is terminated. When the identification signal is not detected but synchronizing signals for the regular non-scrambled TV signal are detected, the tuning operation of the system is also terminated.

In accordance with the present invention, when the scrambled TV signal is received at a selected channel, the confirmation of the AFT operation is performed by a detection of an identification signal representing the scrambled TV signal. There is no need to wait for the descrambling operation when the synchronizing signal is present. The time required for confirming the AFT operation can be, therefore, shortened by the present invention when a scrambled program is selected.

BRIEF DESCRIPTION OF THE DRAWING

The invention will be more readily understood with reference to the accompanying drawing, wherein.

DESCRIPTION OF THE INVENTION

Figure 1:
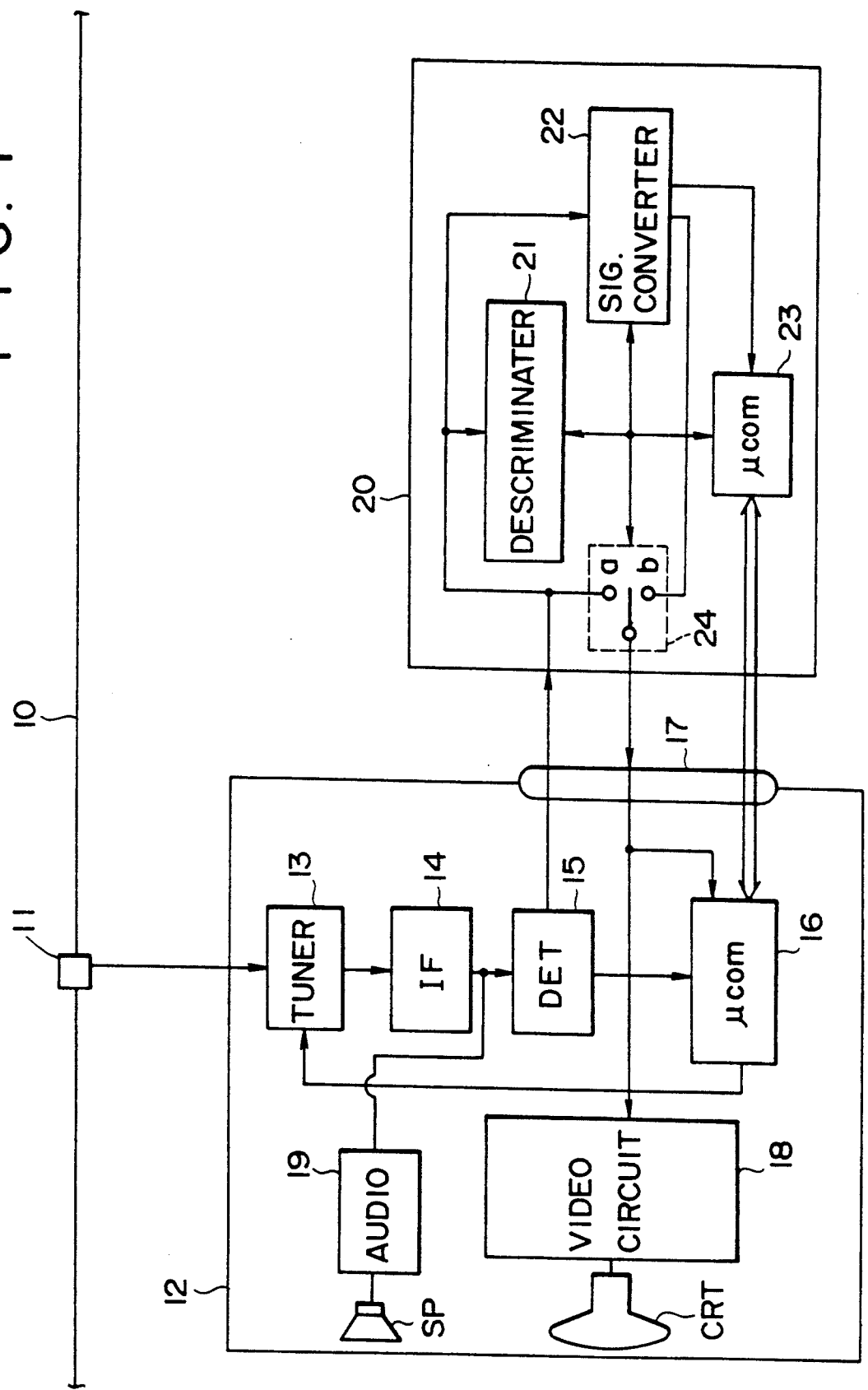
FIG. 1 shows a functional block diagram for the TV signal tuning system of the present invention.

Referring now to FIG. 1, a coaxial cable line (or a trunk line) 10 is extended from a studio (or a head-end) so as to provide TV signals carrying broadcasting programs on several channels to each subscriber's home. A television receiver apparatus 12 receives broadcast programs from the cable line lo through a directional coupler 11. The television receiver apparatus 12 has a front-end (tuner) 13, an Intermediate Frequency (IF) amplifier 14 and a demodulator circuit 15 as in a conventional television receiver apparatus. The tuning operation at front-end 13 is controlled by an output control signal from a micro-computer 16. A video output from a demodulator circuit 15 is sent through a multi-port connector 17 to a descrambler 20 located outside of the television receiver apparatus 12. The video signal is then sent back to the television receiver's video circuit 18 through the multi-port connector 17 for display on a cathode ray tube (CRT). An output of the IF amplifier 14 comprises a voice sub-carrier which is sent to a speaker SP through an audio processing portion 19.

A descrambler 20 has a discriminator circuit 21, a signal converter 22, a micro-computer 23 and a switch 24. The discriminator circuit 21 detects an information signal which indicates that the video signal is scrambled. The signal converter 22 deciphers the scrambled video signal and converts it to a regular video signal (such as NTSC, PAL or SECAM). The micro-computer 23 serves as a descrambling controller. Microcomputer 23 sends and receives control data periodically back and forth between another micro-computer 16 of the television receiver apparatus 12. For example, data representing an operational step for deciphering the scrambled signal is transferred to the television receiver apparatus 12. On the other hand, data representing an operational step during the tuning operation can be also transferred to the descrambler 20. The switch 24 is used to change the route for the video signal. The operation of the above television receiver apparatus 12 and the descrambler 20 will be described next.

When a tuning command is received by the microcomputer (16 for example, through a remote commander), it provides the front-end (tuner) 13 with tuning data for tuning to a desired channel. The automatic frequency tuning (AFT) operation can be performed by detecting levels of the AFT output signal coming out of the demodulator circuit 15. For this operation, it should be determined whether this AFT output signal represents a video signal portion. It can be confirmed whether the demodulated signal has a video signal, for example, by counting H or V sync. signals. When these synchronizing signals cannot be found (for example when tuning to the voice signal portion), the AFT operation continues to adjust the frequency of the tuner up or down until the proper tuning Condition can be achieved for a regular (non-scrambled) video signal. This AFT operation is carried out by slightly changing the local oscillating frequency and looking for the tuning point for a video signal portion. When regular (non-scrambled) TV is received and then an AFT output is obtained, the AFT operation can be completed after counting H or V sync. signals among the demodulated output to confirm that the demodulated output is a video signal.

The switch 24 of descrambler 20 is set in (a) position when the information signal after scrambling cannot be found among the demodulated output. The input video signal to descrambler 20 is therefore sent back as it is to the video circuit 18 of the television receiver apparatus 12. However, when a selected channel of the TV signal is scrambled, the discriminator circuit 21 detects the scrambling information signal. Upon detection of this scrambling information signal, the signal converter 22 starts a deciphering operation and the switch 24 changes to position (b). When the descrambled video signal is formed at the descrambler 20, the micro-computer 23 sends data representing a completion of decipher to the TV receiver apparatus 12. If the method used for confirming the precise tuning point is the result of counting H or V sync. signals, the counting operation would start only after receiving the data representing the completion of decipher. Therefore, a longer time is necessary for completing the AFT operation whenever a scrambled TV signal is selected.

Figure 2:
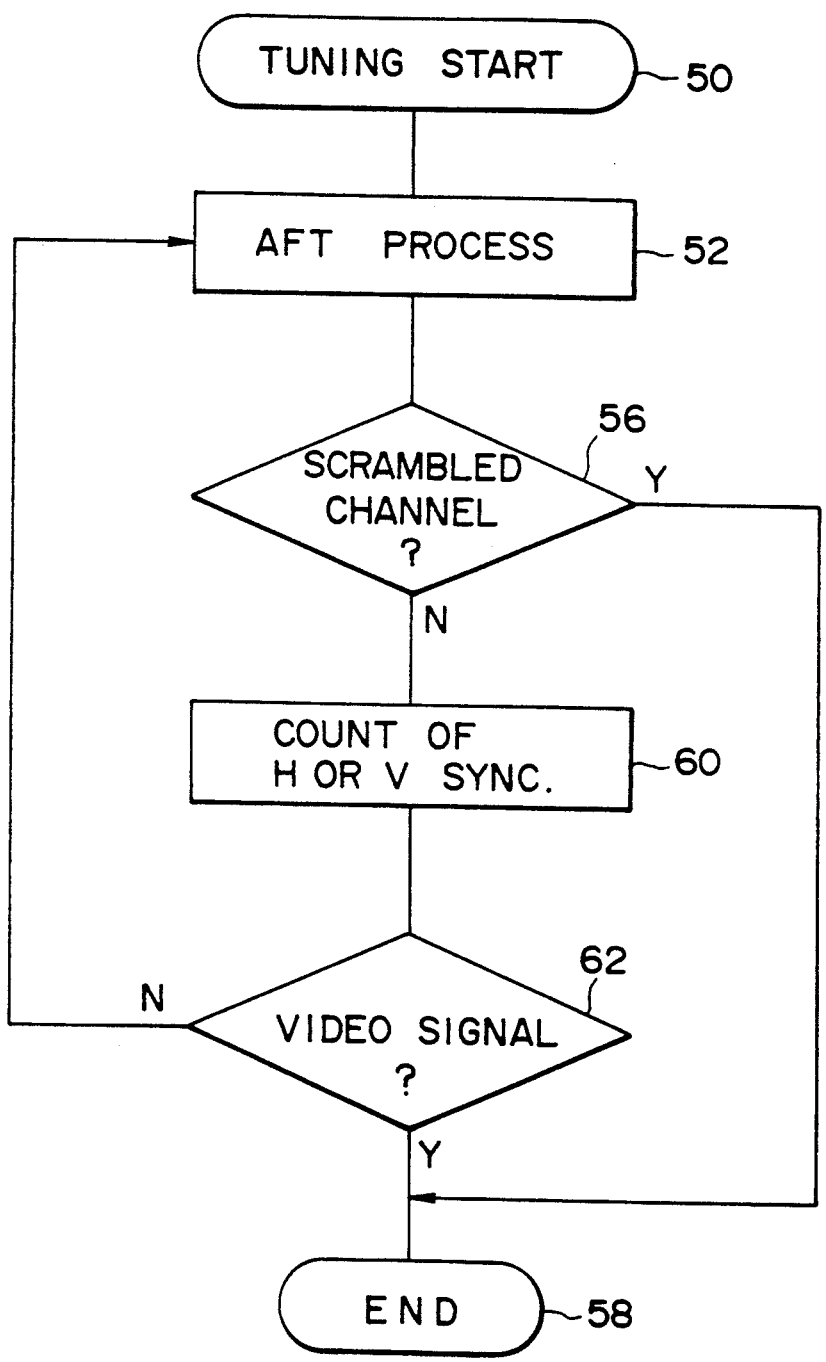
FIG. 2 shows a flow chart of the AFT operation when tuning by the TV signal tuning system of the present invention.

Referring now to FIG. 2, this shows a flow chart in accordance with the present invention for reducing the time for the tuning operation. As shown in FIG. 2, after the command 50 for starting the tuning operation, the AFT process is performed at step 52. During the AFT process, the discriminator 21 determines whether the scrambling information signal is present at step 56. If so, a detecting signal is generated. The detecting signal is then transferred through the micro-computer 23 to micro-computer 16 in the TV receiver 12. Once the scrambling information signal is detected, it can be assumed that precise AFT operation has resulted in the detection. The AFT operation is, therefore, terminated at step 58 immediately after the detection of the scrambling information, according to this invention.

If there is no detection of scrambling information at step 56, the process of counting H or V sync. is initiated at step 60. After confirming the demodulated output has H or V sync. signals at step 62, the AFT operation can be terminated with no detection of the scrambling information. If no video signal is detected at step 62, the process loops back to step 52.

While specific embodiments of the invention have been shown and disclosed, it is to be understood that numerous changes and modifications may be made by those skilled in the art without departing from the scope and intent of the invention.

What is claimed is

1. A tuning system for a television signal in which a TV receiver apparatus and a signal decipher apparatus are connected to each other to receive both of a scrambled TV signal and a non-scrambled TV signal comprising:

first means for terminating a tuning operation when said signal decipher apparatus detects an identification signal representing said scrambled TV signal, second means for terminating said tuning operation when said identification signal is not detected but a synchronizing signal for said non-scrambled TV signal is detected.

2. A tuning system for a television signal to receive both of a scrambled TV signal and a regular non-scrambled TV signal comprising:

tuning means for providing an automatic frequency tuning process by detecting an intermediate frequency signal and using the detected signal as a variable voltage input to a local oscillator circuit of a tuner, detecting means for detecting an information signal to identify said scrambled TV signal, counting means for counting Horizontal or Vertical synchronizing signals to obtain a count, terminating means for terminating said automatic frequency tuning process of said tuning means whenever a first of said detection of detecting means or said count of counting means occurs.

* * * * *